US010753365B2

(12) United States Patent
Tse et al.

(10) Patent No.: US 10,753,365 B2
(45) Date of Patent: Aug. 25, 2020

(54) COOLING FAN MODULE (71) Applicant: Johnson Electric S.A., Murten (CH)

(72) Inventors: Kwok Kuen Tse, Hong Kong (CN);
Long Yu, Shenzhen (CN); Jian Dong,
Shenzhen (CN); Qiu Yang Zhang,
Shenzhen (CN); Rui Feng Qin, Hong
Kong (CN)

(73) Assignee: JOHNSON ELECTRIC
INTERNATIONAL AG, Murten (CH)

( * ) Notice: Subject to any disclaimer, the term of this
patent is extended or adjusted under 35
U.S.C. 154(b) by 322 days.

(21) Appl. No.: 14/988,530

(22) Filed: Jan. 5, 2016

(65) Prior Publication Data
US 2016/0208810 A1 Jul. 21, 2016

(30) Foreign Application Priority Data

Jan. 5, 2015 (CN) .......................... 2015 1 0003977

(51) Int. Cl.
F04D 27/00 (2006.01)
F04D 19/00 (2006.01)
(Continued)

(52) U.S. Cl.
CPC ......... F04D 27/004 (2013.01); F04D 19/002
(2013.01); F04D 25/068 (2013.01); F04D
25/0693 (2013.01); H02K 5/225 (2013.01)

(58) Field of Classification Search
CPC .. F04D 27/004; F04D 19/002; F04D 25/0693;
F04D 25/068; H02K 5/225
(Continued)

(56) References Cited

U.S. PATENT DOCUMENTS 4,575,663 A * 3/1986 Papson ..................... H02P 1/16
318/445
4,709,560 A * 12/1987 Voorhis .............. H05K 7/20154
165/125
(Continued)

FOREIGN PATENT DOCUMENTS

CN            I301355 B       9/2008
CN         102291063 A        12/2011
(Continued)

OTHER PUBLICATIONS

2014, Gate Drive—Wikipedia, the free encyclopedia.pdf.*
(Continued)

Primary Examiner — Christopher S Bobish
(74) Attorney, Agent, or Firm — Muncy, Geissler, Olds &
Lowe, P.C.

(57) ABSTRACT

A cooling fan module for a heat exchanger or the like, has
a motor, a fan driven by the motor and a speed controller
connected between the motor and a power supply. The speed
controller is configured to operate the motor in a high speed
mode and a low speed mode. The speed controller includes
a high speed branch and a low speed branch connected in
parallel. The low speed branch includes a pulse width
modulation circuit configured to reduce an average voltage
by a fixed duty ratio to achieve a low speed operation of the
motor. By eliminating the conventional voltage dropping
resistor, the speed controller reduces the power consumption, thus increasing the efficiency of the module, in the low
speed mode of operation.

12 Claims, 9 Drawing Sheets (51) Int. Cl.
*F04D 25/06* (2006.01)
*H02K 5/22* (2006.01)

(58) Field of Classification Search
USPC .............. 417/44.11, 15, 423.1; 318/400.11
See application file for complete search history.

(56) References Cited

U.S. PATENT DOCUMENTS

| | | | | |
|---|---|---|---|---|
| 5,077,824 A * | 12/1991 | Nagata | ............ | H02P 7/29 318/433 |
| 5,481,433 A * | 1/1996 | Carter | ............ | B60L 3/00 165/185 |
| 5,552,961 A * | 9/1996 | Van Gaal | ............ | H05K 7/20445 165/104.21 |
| 5,947,189 A * | 9/1999 | Takeuchi | ............ | F04D 29/582 123/41.31 |
| 6,055,359 A * | 4/2000 | Gillett | ............ | H02P 7/29 318/432 |
| 6,198,240 B1 * | 3/2001 | Notohara | ............ | B60H 1/00828 318/268 |
| 6,364,004 B1 * | 4/2002 | Ehrmann | ............ | F04D 25/0606 123/41.31 |
| 6,396,238 B1 * | 5/2002 | Miyahara | ............ | H02P 6/10 318/798 |
| 6,577,504 B1 * | 6/2003 | Lofland | ............ | H01L 23/3672 165/185 |
| 6,603,280 B2 * | 8/2003 | Notohara | ............ | H02M 5/4585 318/500 |
| 6,661,134 B2 * | 12/2003 | Sunaga | ............ | H02K 11/33 310/64 |
| 6,781,258 B2 * | 8/2004 | Hashimoto | ............ | G06F 1/206 307/130 |
| 7,045,979 B2 * | 5/2006 | Mehlhorn | ............ | H02P 25/04 318/108 |
| 7,098,617 B1 * | 8/2006 | Oljaca | ............ | G06F 1/206 318/268 |
| 7,190,131 B2 * | 3/2007 | Oh | ............ | H02P 6/21 318/400.11 |
| 7,207,187 B2 * | 4/2007 | Funahashi | ............ | F01C 21/10 62/113 |
| 7,456,597 B2 * | 11/2008 | Kanamori | ............ | H02P 6/08 318/599 |
| 7,598,691 B2 * | 10/2009 | Kuo | ............ | H02P 29/032 318/400.22 |
| 7,724,526 B2 * | 5/2010 | Hinze | ............ | H01L 23/367 165/104.33 |
| 7,755,907 B2 * | 7/2010 | Inagaki | ............ | B60R 16/0239 174/50.5 |
| 8,159,162 B2 * | 4/2012 | Kanamori | ............ | H02P 6/20 318/400.11 |
| 8,248,016 B2 * | 8/2012 | Huang | ............ | F04D 27/004 318/471 |
| 8,251,674 B1 * | 8/2012 | Pairaktaridis | ............ | H02K 9/06 310/62 |
| 8,267,673 B1 * | 9/2012 | Pairaktaridis | ............ | H02K 9/06 310/62 |
| 8,622,711 B2 * | 1/2014 | Wu | ............ | F04D 27/004 417/1 |
| 8,628,310 B2 * | 1/2014 | Koch | ............ | F04D 25/166 123/41.49 |
| 8,680,800 B2 * | 3/2014 | Mitomo | ............ | F04D 27/004 318/461 |
| 9,290,090 B2 * | 3/2016 | Montesano | ............ | B60K 11/02 |
| 2002/0079746 A1 | 6/2002 | Hashimoto | | |
| 2004/0169968 A1 * | 9/2004 | Mohr | ............ | H02H 7/0833 361/33 |
| 2008/0317445 A1 * | 12/2008 | Harashima | ............ | H02P 7/29 388/811 |
| 2011/0229349 A1 * | 9/2011 | Schiel | ............ | F04D 25/082 417/321 |
| 2013/0076174 A1 * | 3/2013 | Wibben | ............ | H02K 9/14 310/64 |
| 2015/0044063 A1 * | 2/2015 | Lu | ............ | H02P 7/29 417/44.11 |
| 2015/0369257 A1 * | 12/2015 | Fujii | ............ | H05K 7/20172 415/177 |

FOREIGN PATENT DOCUMENTS

| | | | |
|---|---|---|---|
| CN | 103683680 A | 3/2014 | |
| CN | 203912430 U | 10/2014 | |
| JP | H037092 A | 1/1991 | |
| JP | H0614576 A | 1/1994 | |
| JP | 6-105563 | * 6/1994 | ............ H04M 7/48 |
| JP | 2005080384 A | 3/2005 | |
| JP | 2010288328 A | 12/2010 | |
| JP | 2014181682 A | 9/2014 | |

OTHER PUBLICATIONS

Machine translation of JP 6-105563.*
An Office Action dated Sep. 1, 2019 in corresponding JP Application No. 2016-000639 is attached.
Attached is the Chinese Office Action for corresponding Application No. 201510003977.3 dated Mar. 27, 2019.

* cited by examiner

COOLING FAN MODULE

CROSS REFERENCE TO RELATED APPLICATIONS

This non-provisional patent application claims priority under 35 U.S.C. § 119(a) from Patent Application No. 201510003977.3 filed in The People's Republic of China on Jan. 5, 2015, the entire contents of which are hereby incorporated by reference.

FIELD OF THE INVENTION

This invention relates to a cooling fan module for a heat exchanger of a vehicle or the like and in particular, to a cooling fan module having a speed controller.

BACKGROUND OF THE INVENTION

A cooling fan module comprises a fan driven by an electric motor. Cooling fan modules are used, for example in vehicles to cool the radiator of the engine of a conventional vehicle or the battery of an electric vehicle.

The motor drive circuit of a conventional two speed cooling fan module has a high-speed branch and a low-speed branch which are connected in parallel. When the high-speed branch is turned on, the motor runs at a high speed. When the low-speed branch is turned on and the high-speed branch is turned off, the motor runs at a low speed. Generally, power is directly connected to an input terminal (for example, a positive electrode) of the motor through the high-speed branch, and the low-speed branch outputs power to the motor terminal at a reduced voltage via a voltage dropping resistor. In this case, if the motor is running at a low speed, the voltage dropping resistor generates a lot of heat, which causes a great loss.

As known to those skilled in the art, a Pulse Width Modulation (PWM) circuit has an adjustable duty ratio, and the average value of an output voltage may be changed by adjusting the duty ratio of the PWM circuit. An improved variable speed cooling fan module is provided, in which the PWM circuit with an adjustable duty ratio is used to replace the conventional high-speed branch and low-speed branch.

In a vehicle radiator cooling system, the PWM circuit is connected to an Engine Control Unit (ECU) of the vehicle through a control terminal, and the duty ratio changes in response to instructions from the ECU in a real-time manner, thus the output voltage is adjusted and the motor is provided with various voltages to operate at different speeds in a low speed range. For example, where the duty ratio is 100%, the PWM circuit is equivalent to the conventional high-speed branch, the motor runs at a high speed; or where the duty ratio is smaller than 100%, the motor runs at a lower speed.

The loss of the PWM circuit described above is smaller than that of the convention circuit with the voltage dropping resistor. However, the overall cost is greatly increased because an additional control circuit (for example, a circuit for adjusting the duty ratio) is included in the PWM circuit. Besides, the conventional high-speed branch and low-speed branch connected in parallel are replaced by a power supply branch in the PWM circuit and the PWM circuit has an additional control terminal, which means that the interface of the cooling fan module adopting the PWM circuit is incompatible with the conventional interface. In the vehicle industry, different components are provided by different providers, hence, the incompatibility of the interface has a serious impact on sales of the cooling fan module adopting the PWM circuit and applications of the cooling fan module.

Therefore, an improved technical solution is desired.

SUMMARY OF THE INVENTION

Hence there is a desire for a cooling fan module having an improved efficiency in a low speed operating mode.

Accordingly, in one aspect thereof, the present invention provides a cooling fan module comprising: a motor, a fan driven by the motor and a speed controller connected in series between the motor and a power supply for the motor, wherein the speed controller comprises a high speed branch and a low speed branch which are connected in parallel, the low speed branch comprises a pulse width modulation circuit connected in series, and the pulse width modulation circuit is configured to reduce an average voltage by a fixed duty ratio to achieve a low speed operation of the motor.

Preferably, the low speed branch further comprises a voltage modulation circuit connected in series, and the voltage modulation circuit is configured to disconnect the low speed branch via the pulse width modulation circuit where an input voltage is higher than a preset high voltage threshold or lower than a preset low voltage threshold.

Preferably, the low speed branch further comprises a current protection circuit, the current protection circuit comprises a current measurement resistor and a switch circuit connected in series and the current protection circuit is configured to control the switch circuit to adjust the current to be within a preset current threshold via the pulse width modulation circuit, when a current flowing through the current measurement resistor is larger than the preset current threshold.

Preferably, the switch circuit comprises a gate drive and a MOS transistor, an output signal of the pulse width modulation circuit is inputted to an input terminal of the gate drive and an output signal of the gate drive is inputted to the MOS transistor.

Preferably, the low speed branch further comprises a temperature detection circuit configured to measure a temperature.

Preferably, the speed controller comprises a printed circuit board supporting the pulse width modulation circuit.

Preferably, the speed controller comprises a shell and a heat sink which are fitted together to form an outer shell of the speed controller, and the printed circuit board is installed inside the outer shell and heat is dissipated through the heat sink.

Preferably, the heat sink comprises several fingers extending outwardly to increase heat dissipation.

Preferably, inductors and capacitors are installed on the printed circuit board, the inductors and the capacitors protrude from the printed circuit board in a direction towards the heat sink, and the heat sink has a cavity to accommodate the inductors and the capacitors.

Preferably, the heat sink comprises fingers extending outwardly from a back of the cavity to increase heat dissipation.

In the cooling fan module according to embodiments of the present invention, by replacing the conventional voltage dropping resistor for the low speed operation by a fixed duty ratio PWM circuit, the efficiency of the module is significantly increased.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
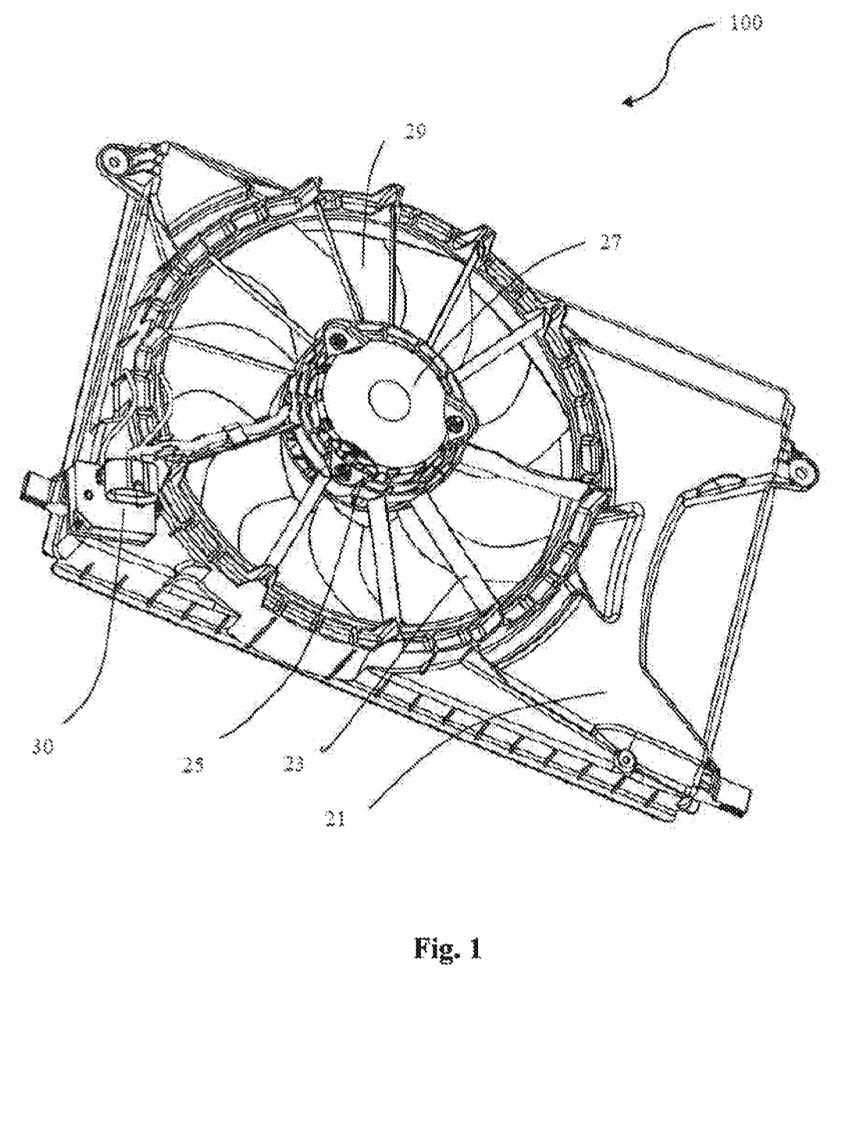
FIG. 1 illustrates a cooling fan module according to a preferred embodiment of the invention.

FIG. 1 illustrates a cooling fan module 100 according to the present invention, which includes a fan shroud 21, a motor 27 installed on the fan shroud 21, a fan 29 installed on a shaft of the motor 27 and a speed controller 30 installed on the fan shroud 21. The fan shroud 21 has a large vent and several spokes 23 stretching toward the center of the vent, and a hub 25 fixed to the ends of the spokes 23. The motor 27 is installed on the hub 25. The motor 27 and the fan 29 are disposed in the vent.

Figure 2:
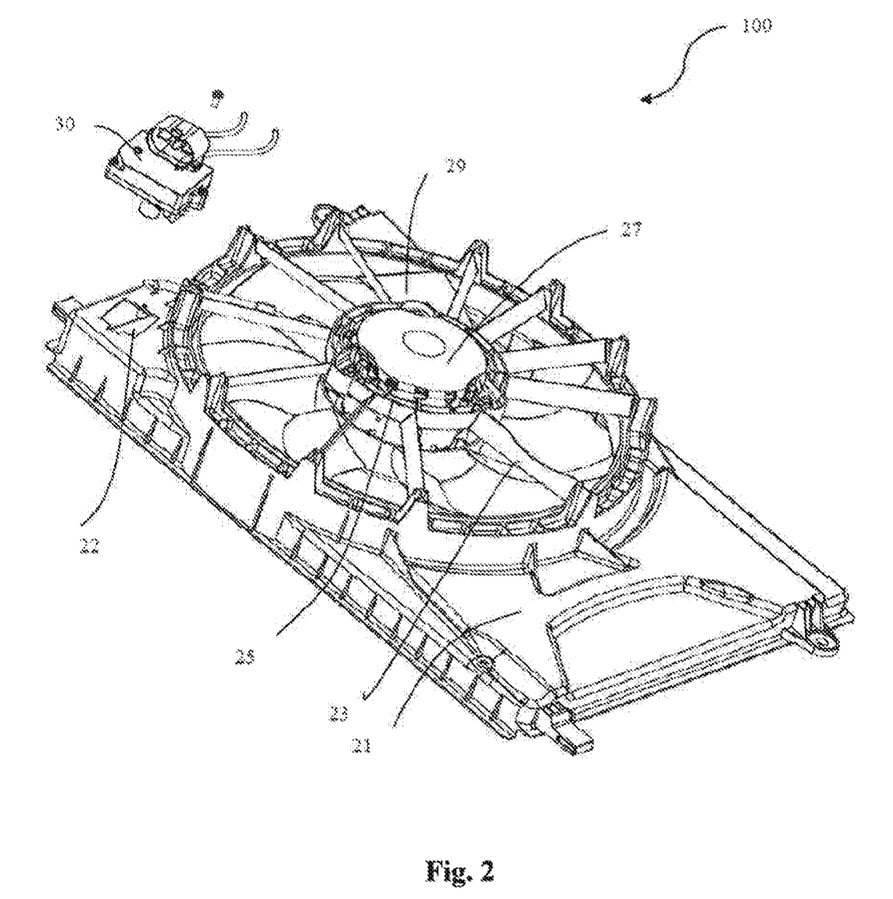
FIG. 2 illustrates assembly of a speed controller onto the cooling fan module of FIG. 1.

Referring to FIG. 2, the fan shroud 21 has a cut-out or recess 22 in which the speed controller 30 is installed. As for circuit connections, the speed controller 30 is connected in series between a power and the motor 27, and is configured to change the speed of the motor by changing the output voltage applied to the motor.

Figure 3:
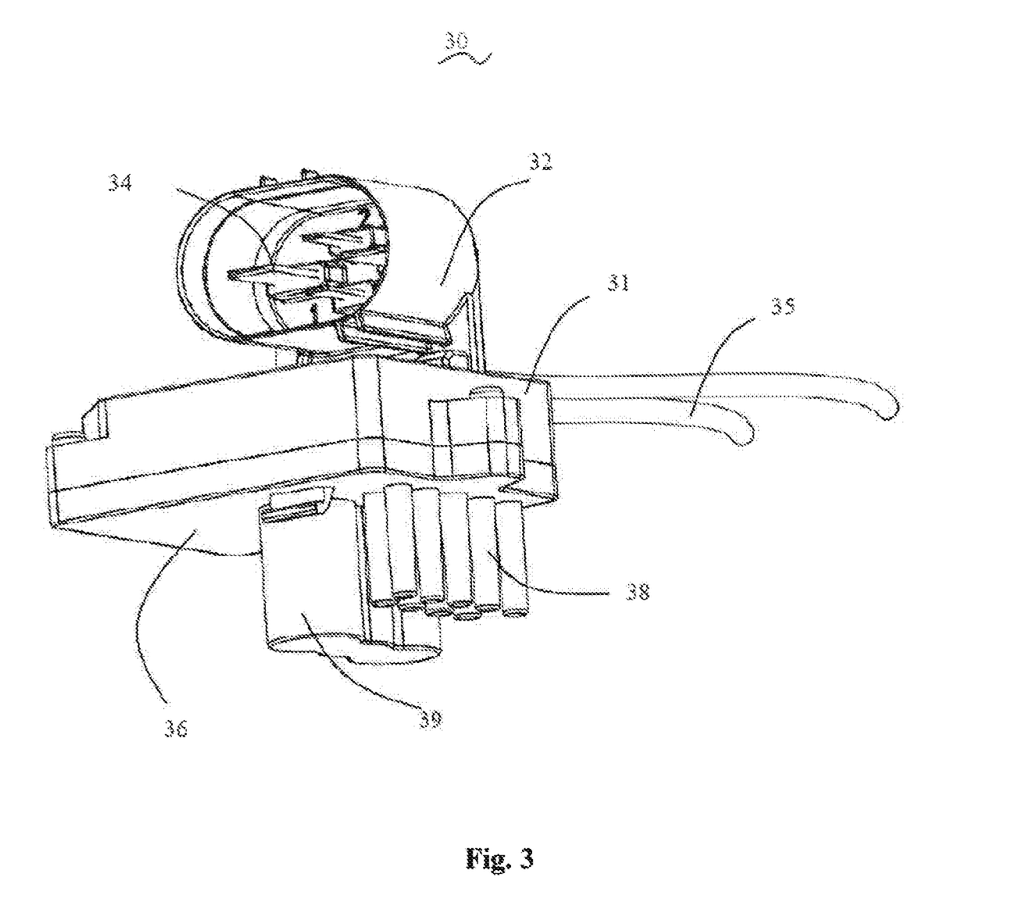
FIG. 3 illustrates the speed controller of FIG. 2.
Figure 4:
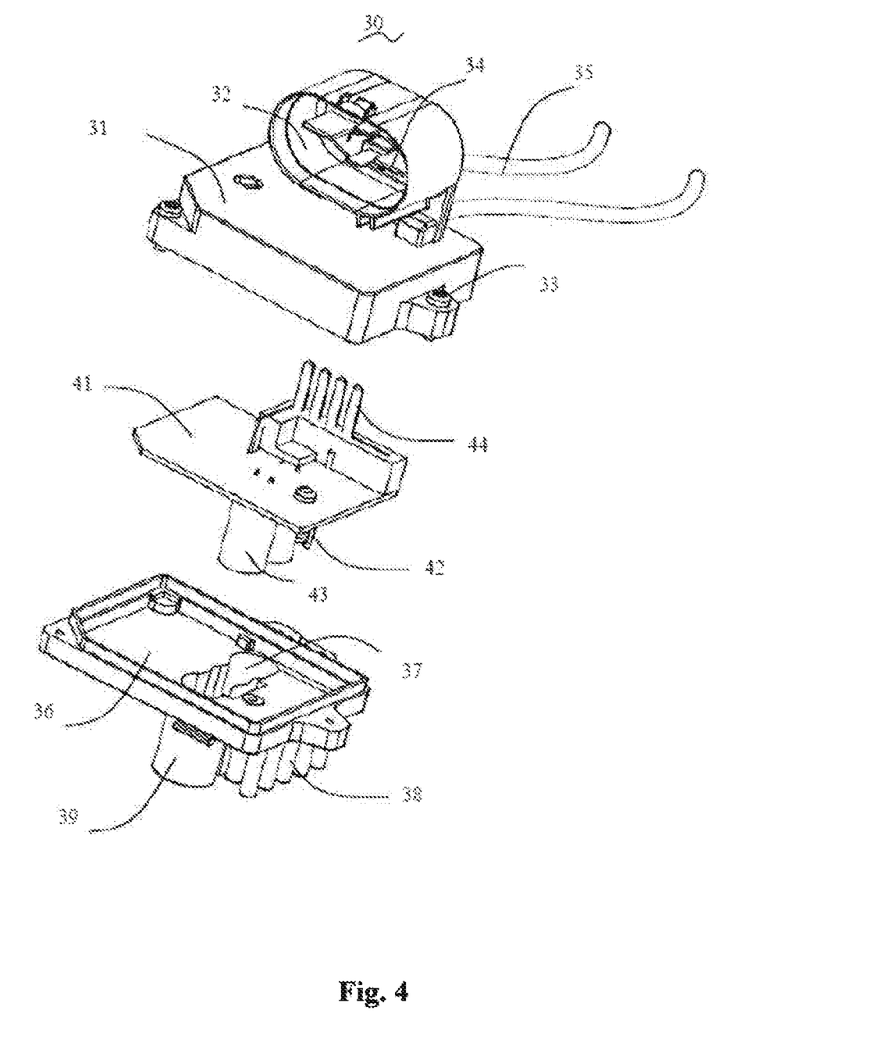
FIG. 4 is a partially exploded view of the speed controller.

Referring to FIGS. 3 and 4, the speed controller 30 includes a shell 31 and a heat sink 36 which are snapped together, and a printed circuit board 41 installed inside the heat sink 36. Preferably, the heat sink 36 has an inner surface, and edges of the inner surface of the heat sink 36 form discrete protrusions, for abutting against the printed circuit board. Preferably, the shell 31 and the heat sink 36 are of half-shell structures which are joined together with bolts 33 to form a full shell. A PWM circuit which includes components such as inductors 42 and capacitors 43, is formed on the printed circuit board 41. The components which generate heat such as the inductors 42 and the capacitors 43 are arranged on a side of the printed circuit board 41 facing the heat sink 36. The heat sink 36 has a cavity 37 to accommodate the heat generating components, to better dissipate the heat from these components. Heat dissipation fingers 38 protrude from a surface of the main body of the heat sink 36, to increase the heat dissipation area of the heat sink 36. Preferably, a wall 39 of the cavity 37 also protrudes from the surface of the main body of the heat sink.

Figure 5:
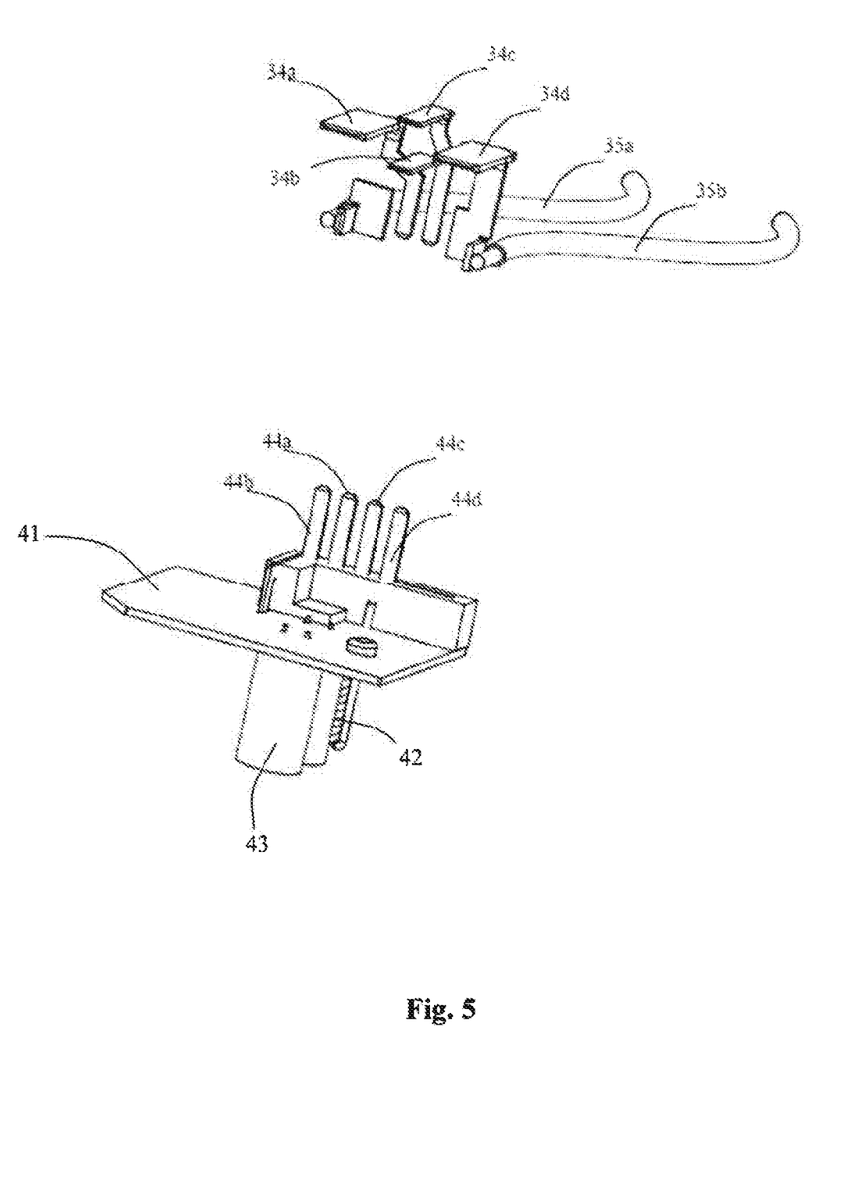
FIG. 5 is a partially exploded view of the speed controller with a shell and heat sink removed.

Referring to FIGS. 4 and 5, a connector 32 is arranged on the shell 31, four input terminals 34, i.e., 34a, 34b, 34c and 34d, are installed inside a connector 32 and are for receiving a input voltage. Preferably, positions and functions of the four input terminals 34a to 34d are the same as those of conventional connectors. For example, the input terminal 34a is connected to a negative electrode of an external power, the input terminal 34c is connected to a positive electrode of the external power to operate the motor at low speed, the input terminal 34d is connected to the positive of the external power to operate the motor at high speed, and the input terminal 34b is a reservation terminal.

The printed circuit board 41 has four terminals, i.e., 44a, 44b, 44c and 44d. The terminal 44a is connected to the input terminal 34a to be connected to the negative electrode of the external power, the terminal 44d is connected to the input terminal 34c to be connected to the positive electrode of the external power, and the terminal 44d is connected to the input terminal 34d to be connected to the positive electrode of the external power. The two terminals 44a and 44c in the middle are input terminals and electrically connected to the terminals 34a and 34c of the connector 32, respectively. The two terminals 44b and 44d are output terminals and connected to two output cables 35a and 35b, respectively. In the embodiment, the output cables 35 extends out of the shell 31 and is connected to the motor 27.

Figure 6:
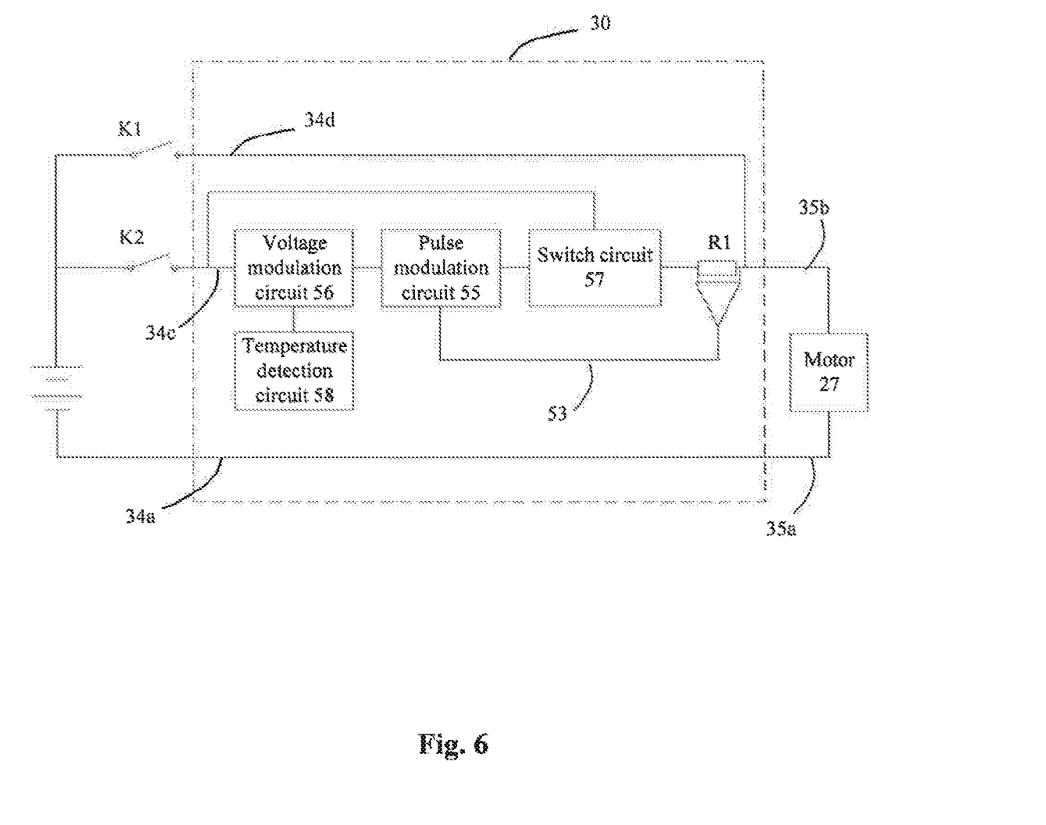
FIG. 6 is a block circuit diagram of the speed controller.

Referring to the block diagram of FIG. 6, as for circuit connections, the speed controller 30 is connected in series between the power and the motor 27. In the embodiment, the input terminal 34a is connected to the negative electrode of the power, and the input terminals 34c and 34d are connected to the positive electrode of the power supply. When the input terminal 34d is turned on via a switch K1, the motor operates at high speed. Where the input terminal 34c is turned on via a switch K2 and the input terminal 34d is not turned on via the switch K1, the motor operates at low speed. In addition, where both K1 and K2 are switched on, the motor operates at high speed because the power supply still supplies power to the motor via the switch K1. A voltage modulation circuit 56 is connected in series between the input terminal 34c and a pulse width modulation circuit 55. Once it is detected that the voltage is not within a normal threshold range, for example, the voltage is higher than a preset high voltage value or lower than a preset low voltage value, the voltage modulation circuit 56 controls the pulse width modulation circuit 55 to stop the motor. Assumed that the normal threshold range is from 9V to 16V, the pulse width modulation circuit 55 stops the motor when the voltage of the power supply is lower than 9V or higher than 16V.

In the embodiment, the low speed operation of the motor is achieved in a way of pulse width modulation. The input terminal 34c is connected in series to the pulse width modulation circuit 55 and then connected to the motor 27, and the pulse width modulation circuit 55 reduces the voltage and current supplied to the motor by a preset duty ratio, and thus the low speed operation of the motor is achieved. Compared with the conventional solution of connecting a voltage dropping resistor in series, the solution of connecting the pulse width modulation circuit 55 in series is used according to the present invention, to achieve the low speed operation of the motor with a lower loss and a higher efficiency.

Figure 7:
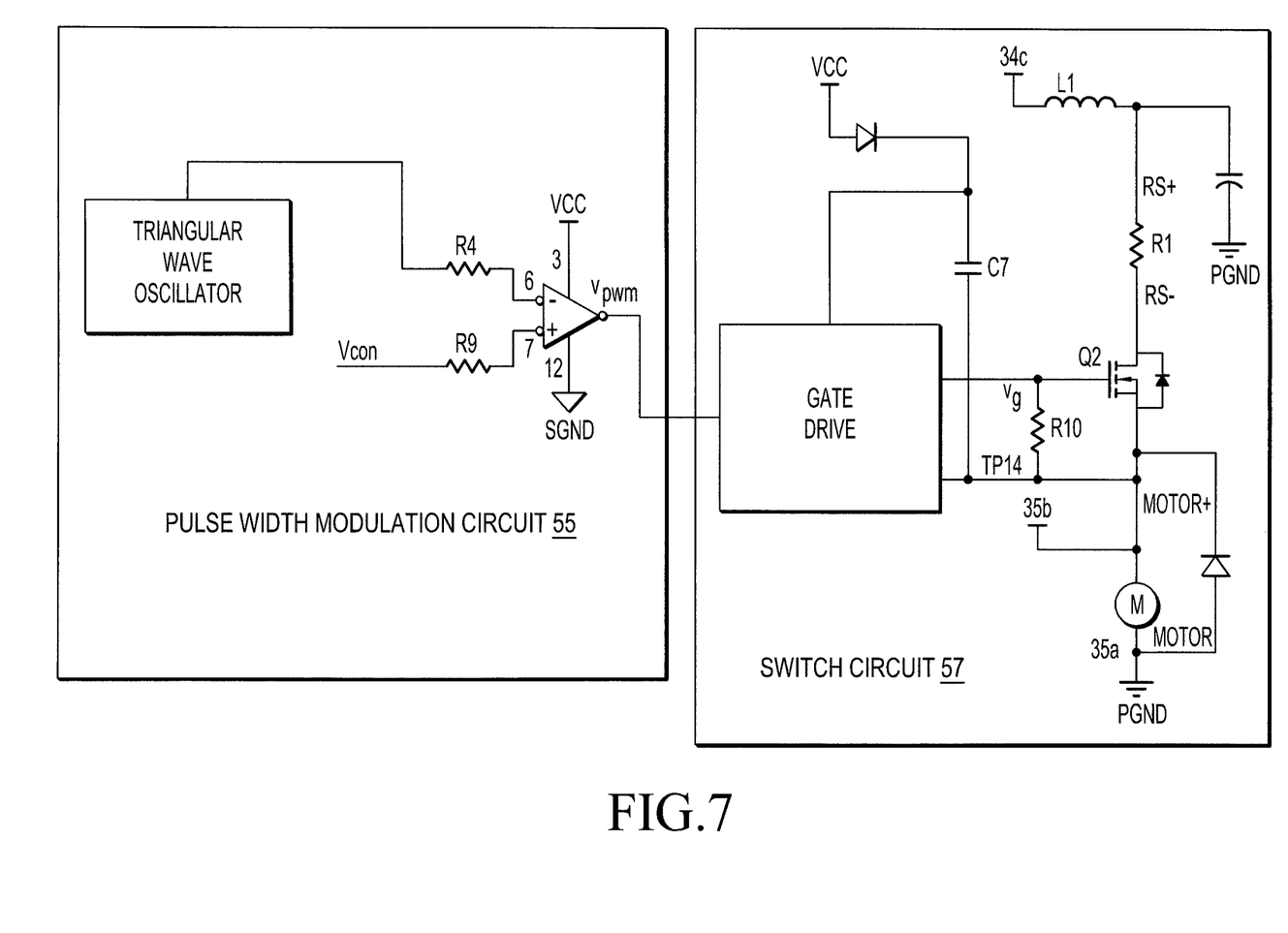
FIG. 7 is a schematic circuit diagram of a pulse width modulation circuit and switch circuit illustrated in FIG. 6.

FIG. 7 is a schematic circuit diagram of the pulse width modulation circuit 55 and a switch circuit 57 according to an embodiment of the invention. A voltage signal $V_{pwm}$ with a fixed duty ratio is generated by comparing a continuous triangular wave generated by a triangular wave oscillator with a direct current control signal Vcon. The gate drive in the switch circuit 57 is configured to convert the voltage signal $V_{pwm}$ into $V_g$ to drive a high-side MOS transistor Q2, and a voltage, lower than the voltage from the input terminal 34c, is supplied to the motor through Q2.

Figure 8:
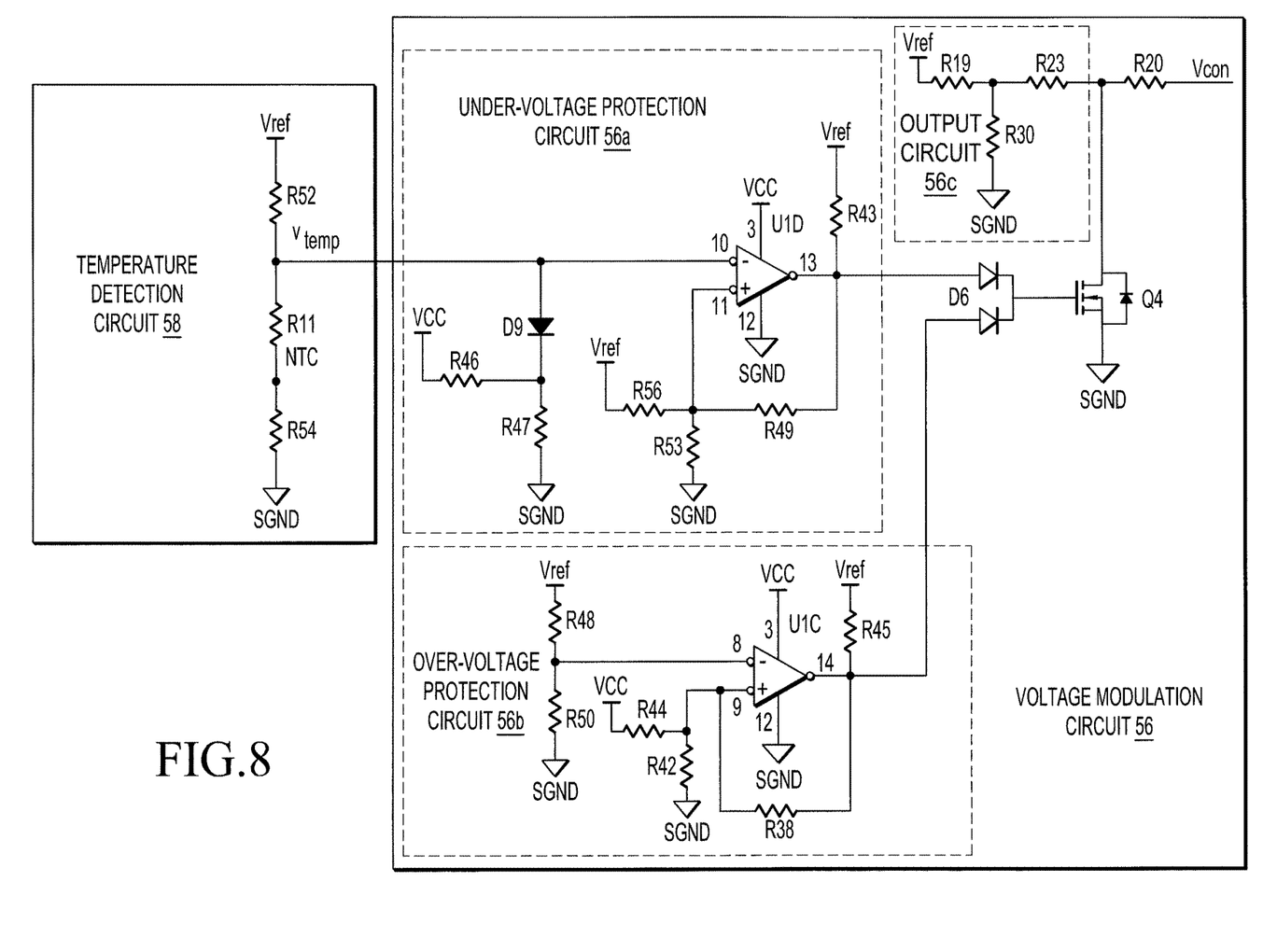
FIG. 8 is a schematic circuit diagram of a voltage modulation circuit and a temperature detection circuit illustrated in FIG. 6.

Furthermore, reference is made to FIG. 8, which illustrates the voltage modulation circuit 56 and a temperature detection circuit 58 according to an embodiment of the invention. The final output of the voltage modulation circuit 56 is usually a fixed voltage provided by the circuit 56c, and is also the direct current control signal Vcon inputted to the pulse width modulation circuit 55. The under-voltage protection circuit 56a above is configured to manage the under-voltage state, and Vcc is a voltage from the input terminal 34c. When Vcc is too low, the comparator U1D outputs a high voltage to turn Q4 on, so that the direct current signal inputted to the pulse width modulation circuit 55 is interrupted. On the other hand, when the voltage value of Vcc is larger than 9V, the comparator provides zero voltage for Q4 to turn Q4 off, and thus the signal Vcon may be kept at a fixed level. The over-voltage protection circuit 56b below is configured to manage the over-voltage state. Where the voltage Vcc is too high, the comparator U1C interrupts the signal Vcon. On the other hand, after the voltage Vcc is restored under 16V, the comparator U1C restores the signal Vcon to a normal level. The temperature detection circuit 58 is connected in series between the input terminal 34c and the motor 27. The temperature detection circuit 58 includes a temperature sensor which is configured to sense the temperature of the printed circuit board 41 and the environment temperature. When the detected temperature is higher than a preset temperature threshold, the voltage modulation circuit 56 is controlled to stop operating to disconnect the low-speed branch, thereby achieving the function of temperature protection. For example, when the temperature of the printed circuit board is higher than 130 degrees Celsius, the temperature sensor controls the voltage modulation circuit 56 to stop operating to disconnect the low-speed branch. As illustrated in FIG. 8, the temperature detection circuit 58 is a voltage divider, and a negative temperature coefficient thermistor is used to generate a temperature-related voltage and affect the under-voltage protection circuit 56a. If the temperature is too high, $V_{temp}$ may decrease and the comparator UM may turn Vcon to zero, and thus the motor stops operating.

Figure 9:
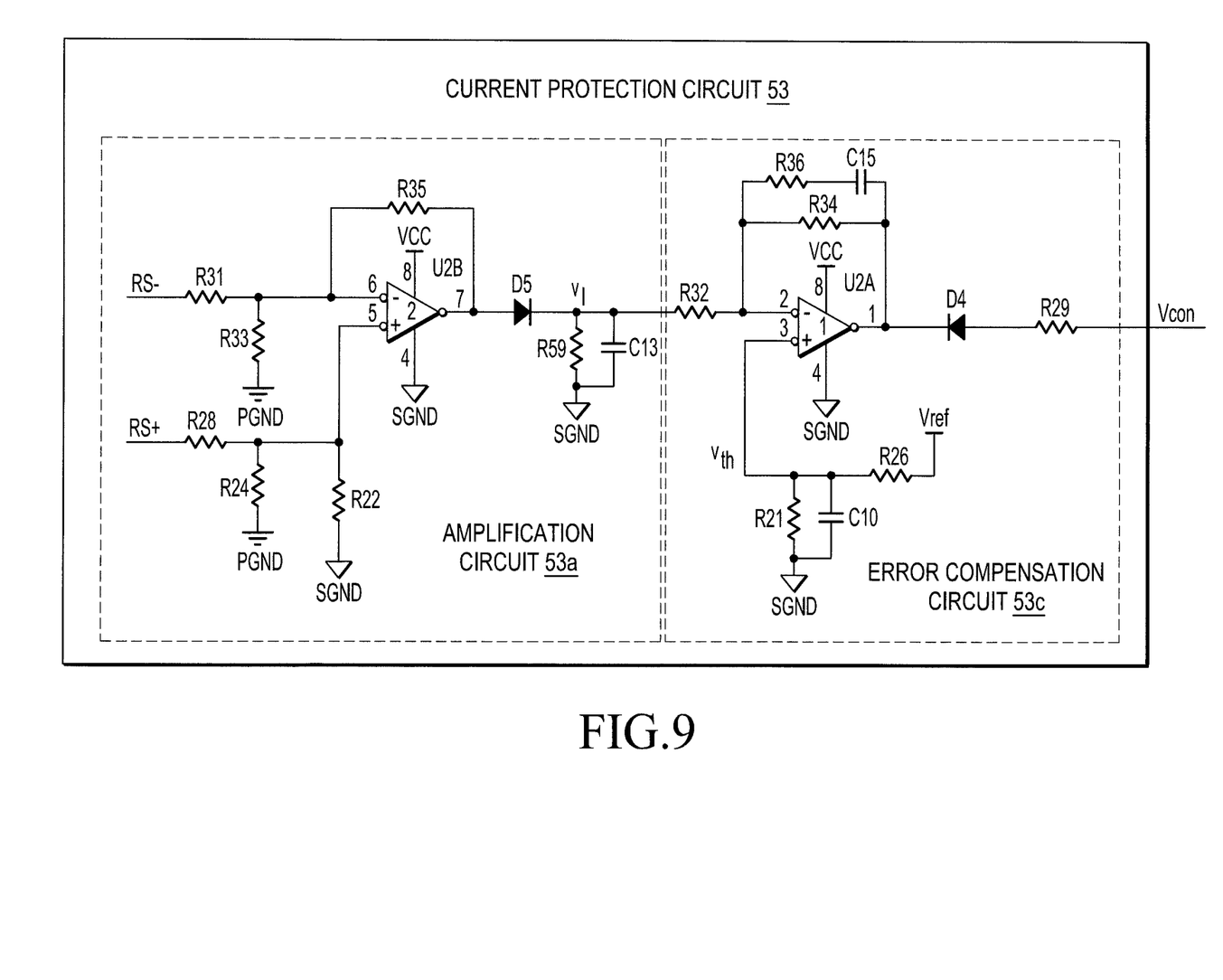
FIG. 9 is a schematic circuit diagram of a current protection circuit illustrated in FIG. 6.

Furthermore, referring to FIG. 9, a current protection circuit 53 is connected in series between the input terminal 34b and the motor 27. The current protection circuit 53 includes a current measurement resistor R1 which is connected in series between the pulse width modulation circuit 55 and the motor 27 and configured to measure an input current of the motor. The current signal detected by the current measurement resistor R1 is amplified by an amplification circuit 53a, and then an output signal $V_I$ is compared with a predetermined threshold $V_{th}$ in an error compensation circuit 53c, to compensate the pulse width modulation circuit 55 with the current signal Vcon. By comparing $V_I$ and $V_{th}$ cyclically using such a negative feedback circuit, the current threshold of the motor in an over-current state may be limited. Therefore, the motor can still be driven where the current is larger than a threshold (for example, under the circumstance of locked rotor), and the motor can be restored to be in a normal operating state once it is detected that the current of the motor is smaller than the threshold.

An input terminal of the switch circuit 57 is connected to the positive electrode of the power and an output terminal of the pulse width modulation circuit 55, and an output terminal of the switch circuit 57 is connected to an input terminal of the current protection circuit 53. The switch circuit 57 is configured to prevent the circuit voltage from being too large or too small, or prevent the circuit from being damaged due to a reversion of the voltage.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which, for brevity, are described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A cooling fan module comprising: a motor, a fan driven by the motor and a speed controller connected in series between the motor and a power supply for the motor, wherein the speed controller comprises a high speed branch and a low speed branch, the low speed branch comprises a pulse width modulation circuit connected in series, and the pulse width modulation circuit is configured to reduce an average voltage by a fixed duty ratio to achieve a low speed operation of the motor, the power supply supplies power to the motor through one of the high speed branch and the low speed branch when the other one of the high speed branch and the low speed branch is disrupted; wherein the speed controller comprises a printed circuit board supporting the pulse width modulation circuit; the speed controller comprises a shell and a heat sink, and the shell and the heat sink are of half-shell structures which are joined together to form a full outer shell, and the heat sink has an inner surface and an outer surface, and the inner surface of the heat sink is recessed downward to form a cavity, and the cavity has a wall which protrudes from the outer surface of the heat sink, and edges of the inner surface of the heat sink form discrete protrusions abutting against the printed circuit board; and the printed circuit board is installed inside the heat sink and heat is dissipated through the heat sink; the speed controller comprises two output cables; the shell comprises a connector, and the connector comprises several input terminals, and several input terminals are installed inside the connector; one end of several input terminals are for receiving an input voltage from an external power, and the other end of two of several input terminals are directly electrically connected to two output cables, respectively; the output cables extend out of the speed controller, and the output cables are connected to the motor of the cooling fan module.

2. The cooling fan module of claim 1, wherein the low speed branch further comprises a voltage modulation circuit connected in series, and the voltage modulation circuit is configured to disconnect the low speed branch via the pulse width modulation circuit where an input voltage is higher than a preset high voltage threshold or lower than a preset low voltage threshold.

3. The cooling fan module of claim 1, wherein the low speed branch further comprises a current protection circuit, the current protection circuit comprises a current measurement resistor and a switch circuit connected in series and the current protection circuit is configured to control the switch circuit to adjust the current to be within a preset current threshold via the pulse width modulation circuit, when a current flowing through the current measurement resistor is larger than the preset current threshold.

4. The cooling fan module of claim 3, wherein the switch circuit comprises a gate drive and a MOS transistor, an output signal of the pulse width modulation circuit is inputted to an input terminal of the gate drive and an output signal of the gate drive is inputted to the MOS transistor.

5. The cooling fan module of claim 1, wherein the low speed branch further comprises a temperature detection circuit configured to measure a temperature.

6. The cooling fan module of claim 1, wherein the heat sink comprises several fingers extending outwardly to increase heat dissipation.

7. The cooling fan module of claim 1, wherein inductors and capacitors are installed on the printed circuit board, the inductors and the capacitors protrude from the printed circuit board in a direction towards the heat sink, and the cavity of the heat sink to accommodate the inductors and the capacitors.

8. The cooling fan module of claim 7, wherein the heat sink comprises fingers extending outwardly from a back of the cavity to increase heat dissipation.

9. The cooling fan module of claim 1, wherein the low speed branch further comprises a voltage modulation circuit connected in series, and the voltage modulation circuit is configured to disconnect the low speed branch via the pulse width modulation circuit where an input voltage is higher than a preset high voltage threshold or lower than a preset low voltage threshold.

10. The cooling fan module of claim 9, wherein the low speed branch further comprises a current protection circuit, the current protection circuit comprises a current measurement resistor and a switch circuit connected in series and the current protection circuit is configured to control the switch circuit to adjust the current to be within a preset current threshold via the pulse width modulation circuit, when a current flowing through the current measurement resistor is larger than the preset current threshold.

11. The cooling fan module of claim 10, wherein the switch circuit comprises a gate drive and a MOS transistor, an output signal of the pulse width modulation circuit is inputted to an input terminal of the gate drive and an output signal of the gate drive is inputted to the MOS transistor.

12. The cooling fan module according to claim 1, wherein the connector comprises four input terminals, and the four input terminals are installed inside the connector; one end of four input terminals are for receiving an input voltage from an external power; the printed circuit board has four terminals, and the four terminals of printed circuit board connected to four input terminals of the connector, respectively.

* * * * *